Jan. 16, 1951 S. BERMAN 2,537,958

OVERLOAD CONTROL CIRCUIT

Filed Dec. 6, 1945 2 Sheets-Sheet 1

INVENTOR
SAMUEL BERMAN
BY
Pennie, Davis, Marvin and Edmonds.
ATTORNEYS

INVENTOR
SAMUEL BERMAN
BY
Pennie, Davis, Marvin and Edmonds.
ATTORNEYS

Patented Jan. 16, 1951

2,537,958

UNITED STATES PATENT OFFICE 2,537,958

OVERLOAD CONTROL CIRCUIT

Samuel Berman, New York, N. Y., assignor to Waugh Equipment Company, New York, N. Y., a corporation of Maine Application December 6, 1945, Serial No. 633,149

10 Claims. (Cl. 179—171)

This invention relates to electronic amplifier circuits and more especially to the automatic control of such circuits to prevent overload and consequent improper operation of the amplifier.

Electronic amplifiers are employed in a wide variety of fields including communication, signaling, power and various specialized industrial and medical applications. In some instances, overload of an amplifier tube, if not excessive, is of substantially no disadvantage. In other instances where the output voltage or current of the amplifier must always increase with increase of voltage impressed on the input of the amplifier, it is obviously essential that the amplifier output should not decrease with increase of input voltage. However, due to overloading, this undesirable relation of output to input does exit, or tends to exist, especially in high gain, low power amplifiers, within a comparatively small input voltage operating range.

There are many applications demanding high gain amplifiers and comparatively small final output current. One such use is in connection with surgical probes for locating foreign metallic particles in body tissue, as disclosed, for example, in my U. S. Patents No. 2,321,355, and No. 2,321,356, both issued June 8 1943. For such purposes the indicator which is actuated in response to the output current from the amplifier usually requires extremely small power, a power requirement of 50 milliwatts and a current of 1 milliampere being typical. However, the voltage fluctuations, or signal current, impressed on the input side of the amplifier may vary over quite a large range. For example, although the normal operating range of alternating-current input voltage impressed on the amplifier might be from 0.8 of a millivolt to 1.5 millivolts, during the initial or balancing adjustment of the probing device, or during actual use of the device, in the event that it comes very close to a large metallic particle, the input voltage might approach or even reach 120 millivolts. Under such conditions, at least one of the amplifier tubes will be subject to overload, causing the indicating device which is actuated by the amplifier output current to give a false indication of the sense of the change in amplifier input voltage.

By means of the present invention the desired proportionality between the output and input of an amplifier may be retained over a considerably larger range of input voltages than otherwise would be possible in a given amplifier.

Briefly, the invention comprises a negative feedback circuit connected directly between the control grids of two successive vacuum tubes of a multistage amplifier. This circuit includes a rectifier, or other suitable unilateral conducting device, and preferably means for introducing a voltage delay in the operation of the circuit so that it starts to function only after a predetermined input voltage has been impressed on the grid of the first of the two mentioned vacuum tubes.

The invention and the nature of its operation to control overloading in vacuum tube amplifiers will be more clearly understood by reference to the accompanying drawings, wherein.

Figures 1, 2:
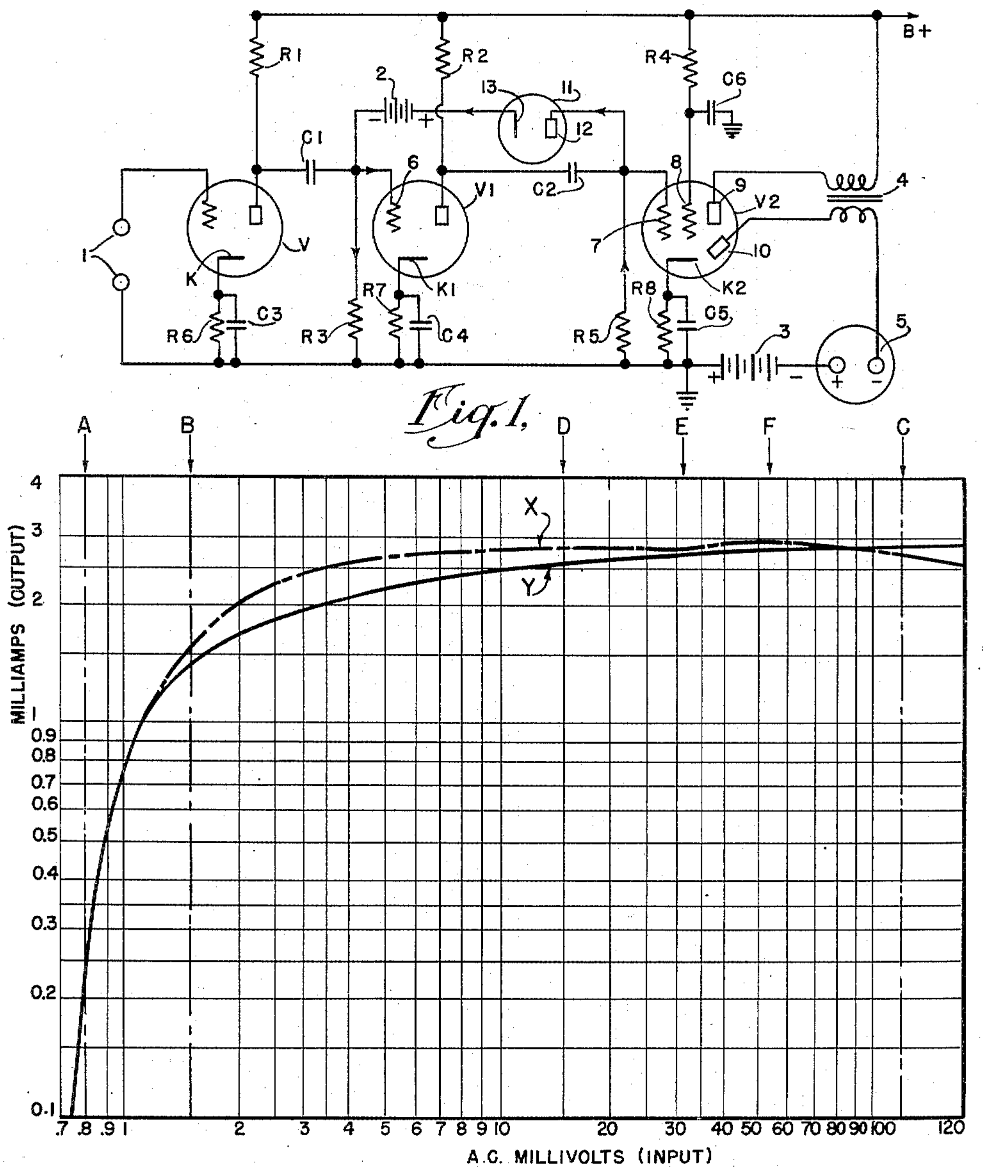
Fig. 1 is a simplified circuit diagram of the control circuit of the invention as applied to a multi-stage amplifier.
Fig. 2 shows two curves which illustrate the control effect of the circuit of the invention.

The circuit diagram of Fig. 1 represents a multi-stage vacuum tube amplifier fundamentally comprising three stages of one vacuum tube each, viz., V, $V_1$ and $V_2$. Amplifiers of this general type are well known and are used for a wide variety of purposes. As is evident from the diagram, the vacuum tubes are coupled to each other by the conventional capacitor-resistor elements. Suitable values for the various elements of this amplifier are given below in connection with a description of Fig. 3. The vacuum tubes V and $V_1$ may be separate devices, as indicated in the drawing, or may comprise a double triode of the 7F7 type, for example, which is the type represented in Fig. 3, the two forms being equivalent. The output tube $V_2$ may be of the 6SF7 type which comprises a control grid 7, a screen grid 8, an amplifier anode 9, and a rectifier anode 10. An output transformer 4 couples the amplified output current of tube $V_2$ to the circuit of indicating meter 5 which includes the diode rectifier $K_2$, 10. This is a convenient manner of energizing the meter 5 which in this instance is a direct-current instrument. The voltage source 3 is connected so as to oppose the rectified current in the meter circuit in order to bring the meter reading to zero when the input circuit, viz., the probe circuit, is balanced for maximum sensitivity, which occurs in the presence of a certain optimum load on the amplifier. This feature of the system has no significant bearing on the present invention, but it is explained in more detail in my copending application Ser. No. 630,913, filed November 26, 1945. Except for the control circuit comprising diode rectifier 11 and potential source 2, in accordance with this invention, the functions of the remaining circuit elements of Fig. 1 should be evident to those skilled in the art.

The overload control circuit of the present invention, while extremely simple in itself, nevertheless is completely effective in preventing or in compensating for the effects of overloading in the amplifier to which it is applied. This control circuit comprises merely a unilateral conducting path connected between the control grids of successive vacuum tubes of the amplifier, there being preferably connected in that path a suitable source of delay potential. In Fig. 1 this control circuit includes a unilateral conducting element comprising a diode rectifier 11 connected in series with a potential source 2 between control grids 6 and 7 of the tubes $V_1$ and $V_2$, respectively, the anode of the rectifier being connected to the grid of the second or succeeding tube and the cathode of the rectifier being connected to the grid of the first or preceding tube.

Figure 3:
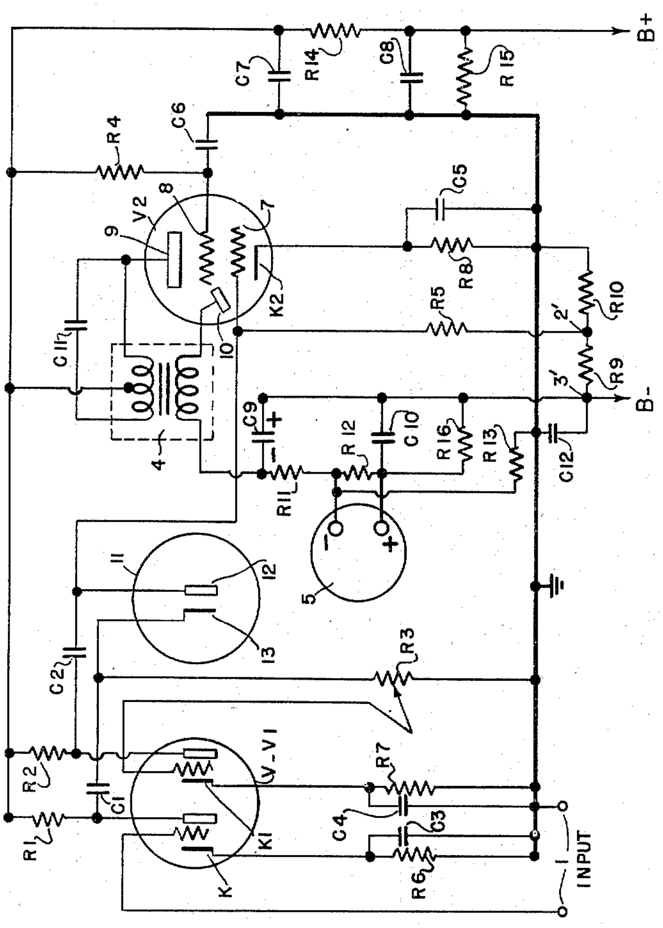
Fig. 3 is a circuit diagram similar to that of Fig. 1 but in a more complete form.

As the result of measurements and tests of the circuit arrangement of Fig. 1 and Fig. 3, both with and without the control circuit of the invention, I believe that the described improvements in operation of the amplifier are the result of the following:

(1) The diode circuit comprises effectively a resistive feedback circuit between the grids 7 and 6 of tubes $V_2$ and $V_1$, respectively, introducing instantaneous negative A. C. feedback on grid 6 during half of each cycle when the grid 7 of tube $V_2$ is positive with respect to the grid 6 of tube $V_1$. By reference to Fig. 1, it will be seen that when grid 7 is positive, unidirectional current will flow in the directions of the arrows, viz., from anode 12 to cathode 13 of diode 11, through potential source 2, downward through resistor $R_3$, and upward through resistor $R_5$, returning to anode 12. Thus, when a negative half cycle of signal potential is impressed on grid 6, a positive potential feedback from the diode is also impressed simultaneously on the same grid and the magnitude of this opposing feedback potential is proportional to the amplitude of the signal potential.

(2) When grid 7 of tube $V_2$ is positive, there is a difference in D. C. potential between grid 7 and grid 6, and current flows through the diode circuit as explained under (1) above. For the same reason the grid current which would otherwise flow from grid 7 to cathode $K_2$ of tube $V_2$ is diverted and flows in the diode circuit. This circuit also includes a parallel branch from grid 6 to cathode $K_1$ of tube $V_1$, so part of the diode current flows through this branch, and part flows through resistor $R_3$ as explained previously. The diode current flow downward through resistor $R_3$ is in the reverse direction to the current normally flowing through that resistor in the absence of the diode control circuit, with the result that a further positive potential is impressed on grid 6. While this superimposed positive potential may not be sufficient to reverse the potential of grid 6 with respect to its cathode $K_1$, it reduces the negative bias to at least about one-half of its original value, and thus further reduces the amplification of tube $V_1$ in proportion to the amplitude of the impressed A. C. signal voltage.

(3) In addition to the loads introduced by the grid resistors $R_3$ and $R_5$, the diode 11 acts as an additional load, reducing the potentials across condensers $C_1$ and $C_2$, alternately, each half cycle, thus reducing the effective A. C. voltage impressed on grids 6 and 7, respectively. Under the conditions existing in this circuit, it may be noted that the effective resistance of the diode might be of the order of 0.25 megohm, which is about fifty times the normal effective resistance of such a diode. This increase in effective resistance is due largely to the opposing effect of the negative potential impressed by the diode circuit on grid 7, which varies with the load.

Since the tendency of a tube to overload does not occur until the A. C. input voltage reaches a certain value (approximately 15 millivolts in the example here described), it is preferable that the operation of the diode control circuit be "delayed" until the input voltage approaches that value. This delay can be achieved by inserting effectively in series in the diode circuit a source of potential which opposes the normal flow of current through the diode. In the specific embodiment of this invention herein illustrated, a fixed D. C. potential source 2 of 2.5 volts was sufficient to effect the desired voltage delay without otherwise appreciably affecting the operation of the amplifier.

It appears that in the amplifier system herein described by way of example, the effect of the diode control circuit is in respect to the intermediate tube $V_1$ and that the operation of tube $V_2$ is not directly controlled by the diode circuit. Measurements made on this system indicate that, in the absence of the control circuit, the apparent overload effect in respect to tube $V_2$ is due to the fact that since no further amplification by tube $V_1$ is obtained at input voltages in excess of that at which tube $V_1$ begins to overload, the final output of the system, viz., the output of tube $V_2$, cannot increase in response to input voltage in excess of the voltage at which tube $V_1$ begins to overload.

The practical effect of the operation of the control circuit of this invention will be clear from reference to the curves of Fig. 2 wherein the dash-dot curve X represents the amplifier output as recorded by meter 5 in response to increase of alternating current input to the amplifier in millivolts. This curve was plotted from measurements taken with milliammeter 5 of the output current from a circuit arrangement such as that shown in Fig. 3, but without the overload control circuit of the present invention. From curve X it will be observed that between an input voltage of 0.8 millivolt (A) and about 15 millivolts (D), an increased reading in output current was obtained, but for practical purposes amplification ceased beyond an input of 15 millivolts. Between 15 (D) and 32 (E) millivolts input, the output current decreased, between 32 (E) and 54 (F) millivolts, the output increased slightly, and in excess of 54 (F) millivolts input, the output steadily decreased. In other words, curve X shows that without the automatic control introduced by the present invention, the output current was erratic and not proportional to the input voltage when the input voltage exceeded approximately 15 millivolts, as indicated by the portions of curve X between points D and C.

On the other hand, inspection of curve Y (Fig. 2) which represents the measured output current with change of input voltage measured in millivolts in respect to the same circuit arrangement, but with the addition of the overload control circuit in accordance with the present invention, shows that at no point in the operating range of the system, even with an input in excess of 100 millivolts, is there any decrease of output current with increase of input voltage. With such operation a decrease of meter reading results only from a decrease of input voltage, i. e., in employing the amplifier in connection with a metal locator as explained in the mentioned patents, it is possible, prior to use, to "tune" and balance the apparatus under conditions of maximum sensitivity, and, in using the probe, the surgeon may be assured that an increase in meter reading can indicate only a decrease in distance between the probe and the foreign particle. Furthermore, this improved result is achieved substantially without loss in gain over the normal operating range of input voltage.

The circuit arrangement of Fig. 3 corresponds to that of Fig. 1 in that Fig. 1 is a simplification of Fig. 3. In both figures like reference characters denote like components. In Fig. 3 the tube $V-V_1$, which may be of the 7F7 type, replaces the tubes V and $V_1$ of Fig. 1 to which it is equivalent. Diode 11 is represented as the same in Figs. 1 and 3, but this unidirectionally conductive element may take any suitable form, a copper oxide rectifier being suitable, for example. In one embodiment of the invention this diode rectifier comprised a cathode and a grid electrode of another type 7F7 tube, this grid having been employed as an anode which was equivalent to anode 12 of Figs. 1 and 3. The remaining electrodes of this 7F7 tube were connected in an auxiliary circuit.

In Fig. 3, as in Fig. 1, the diode control circuit of the invention includes in series a source of delay potential. In this instance, this potential is derived from a voltage divider $R_9-R_{10}$ to which the anode 12 of diode 11 is connected at tap 2'. The unidirectional current flowing through resistors $R_9-R_{10}$ is derived from direct current source B+ B−, not shown in detail. In the illustrated embodiment this tap provides a negative bias of 2.5 volts on anode 12, the cathode of diode 11 being substantially at ground potential. This connection also impresses a negative bias of the same value on grid 7 of tube $V_2$, but the effect on the operation of that tube is negligible. The desired delay effect could also be provided by connecting the lower terminal of resistor $R_5$ to ground, instead of to tap 2', and connecting the cathode 13 of diode 11 to a tap on a voltage source which is 2.5 volts positive. These two alternatives are of course equivalent.

The resistor $R_3$, preferably of the potentiometer type, is provided in order to permit the desired manual control of the gain or amplification of the amplifier. In the arrangement of Fig. 3, indicating meter 5 is connected in series with a source of opposing potential equivalent to potential source 3 of Fig. 1. This source comprises, in Fig. 3, tap 3' on resistor $R_9$, which, in this example, provides a potential of 27 volts to oppose the rectified output of transformer 4. The network including resistors $R_{11}$, $R_{12}$, $R_{16}$ and condensers $C_9$, $C_{10}$, and the needle depressing circuit including resistor $R_{13}$, are included for purposes relating to use of the apparatus in connection with the metal locator previously referred to, and are not a necessary part of the present invention. In order to permit those skilled in the art more readily to practice this invention, the values of the illustrated circuit elements, not already stated, are given below. These values are given only by way of example, however, because, as is well known in the art, the selection of different types of tubes or different requirements in control or operating characteristics might necessitate changes in various of the circuit elements, as well as other modifications in the amplifier circuit arrangement.

| | |
|---|---|
| $R_1$—0.25 megohm | $R_{15}$—.05 megohm |
| $R_2$—0.1 megohm | $R_{16}$—5000 ohms |
| $R_3$—0.5 megohm | $C_1$—.05 mf. |
| $R_4$—.07 megohm | $C_2$—.05 mf. |
| $R_5$—0.5 megohm | $C_3$—10 mf. |
| $R_6$—2500 ohms | $C_4$—10 mf. |
| $R_7$—2500 ohms | $C_5$—100 mf. |
| $R_8$—410 ohms | $C_6$—2 mf. |
| $R_9$—2000 ohms | $C_7$—10 mf. |
| $R_{10}$—200 ohms | $C_8$—10 mf. |
| $R_{11}$—2500 ohms | $C_9$—10 mf. |
| $R_{12}$—2500 ohms | $C_{10}$—10 mf. |
| $R_{13}$—0.15 megohm | $C_{11}$—.01 mf. |
| $R_{14}$—.02 megohm | $C_{12}$—100 mf. |

What is claimed is:

1. In combination with a multi-stage amplifier including at least two successive stages, each stage including a vacuum tube having a control grid, means for restricting the tendency of at least one of said tubes to overload with increase of impressed input voltage on a first of said stages, said means comprising a unilateral conducting path connected directly between the control grid of the vacuum tube in a first of said stages and the control grid of the vacuum tube in a second of said stages so as to feed back to the grid of the first mentioned tube instantaneous voltage of polarity opposite to that of said impressed input voltage.

2. In combination with a multi-stage amplifier including at least two successive stages, each stage including a vacuum tube having a control grid, means for restricting the tendency of at least one of said tubes to overload with increase of impressed input voltage on a first of said stages, said means comprising a unilateral conducting path connected directly between the control grid of the vacuum tube in a first of said stages and the control grid of the vacuum tube in a second of said stages so as to feed back to the grid of the first-mentioned tube instantaneous voltage of polarity opposite to that of said impressed input voltage, and a source of direct-current potential connected in said path in opposition to the direction of normal feedback current flow therein whereby effectively to increase the input voltage at which the feedback operation of the feedback path commences.

3. A combination in accordance with claim 1 wherein said unilateral conducting path comprises a diode rectifier connected directly between the grids of successive vacuum tubes.

4. A combination according to claim 2 wherein said unilateral conducting path comprises a diode rectifier connected directly between the grids of successive vacuum tubes.

5. In a signal voltage amplifier comprising two successive stages coupled together in cascade, each stage including a vacuum tube having a control grid and a cathode, a high-resistance connected between the grid and cathode of each said tube, means for restricting the tendency of at least the second one of said tubes to overload with increase of input signal voltage impressed on the grid of the first of said tubes, said means comprising a diode rectifier connected directly between the grid of the first of said tubes and the control grid of the second of said tubes and connected thereto so as to feed back to the grid of the first of said tubes instantaneous voltage of polarity opposite to that of the impressed signal voltage.

6. A signal voltage amplifier according to claim 5 which includes a source of direct-current potential effectively connected in the feedback path in series with said diode in opposition to the direction of normal feedback current flow therein whereby effectively to increase the input signal voltage at which the feedback operation of said diode commences, said diode and said direct-current source comprising all of the circuit elements in said feedback path.

7. In combination with a multi-stage alternating-current amplifier including at least two successive stages having vacuum tubes coupled in cascade, each vacuum tube having a control grid and a cathode, a high resistance connected between the grid and cathode of each said tube, means for restricting the tendency of at least one of said tubes to overload with increase of impressed alternating-current input voltage on the first of said tubes, said means comprising a diode rectifier connected in series in a feedback path directly between the grid of the first of said tubes and the control grid of a second of said tubes so as to feed back to the grid of the first of said tubes instantaneous voltage of polarity opposite to that of said impressed alternating current voltage, such that said feedback path comprises the sole source of said instantaneous opposing voltage and of a positive grid bias potential automatically developed across at least one of said high resistances.

8. In a signal current amplifier comprising two successive stages, each stage including a vacuum tube having a control grid, a cathode and an anode, capacitor-resistor means coupling the anode of the tube in the first of said stages to the grid of the tube in the second of said stages, whereby signal current effectively passes from the first to the second of said stages, a high-resistance connected between the grid and cathode of each tube, means for restricting the tendency of at least the tube in the second of said stages to overload with increase of signal voltage impressed on the grid of the tube in said first stage, said means including a feedback path comprising a diode rectifier having an anode conductively connected to the grid of the tube in said second stage, and a cathode conductively connected to the grid of the tube in said first stage so as to feed back to the grid of the tube in said first stage instantaneous voltage of polarity opposite to that of said impressed voltage and of a magnitude which is proportional to that of said impressed voltage, and a source of direct-current potential connected in series with said diode with a polarity to oppose the normal direct-current flow from anode to cathode of said diode whereby effectively to increase the input signal voltage at which the feedback operation of said diode commences, said rectifier and said direct-current source comprising all of the circuit elements in the feedback path.

9. In a signal current amplifier comprising two successive stages, each stage including a vacuum tube having a control grid, a cathode and an anode, capacitor-resistor means coupling the anode of the tube in the first of said stages to the grid of the tube in the second of said stages, whereby signal current effectively passes from the first to the second of said stages, a high resistance connected between the grid and cathode of each tube, means for restricting the tendency of at least the tube in the second stage to overload with increase of signal voltage impressed on the grid of the tube in said first stage, said means comprising a negative feedback path separate from said high resistance and connected directly between the grid of the tube in said second stage and the grid of the tube in said first stage so as to feed back to the grid of the tube in said first stage instantaneous voltage of polarity opposite to that of said impressed voltage and of a magnitude which increases with increase of said impressed voltage, and a fixed direct-current potential connected in said path in a direction to oppose said feedback whereby effectively to increase the input signal voltage at which the feedback operation of the diode in said feedback path commences, said rectifier and said direct-current source comprising all of the circuit elements in said feedback path.

10. In combination with a multi-stage amplifier including at least two successive stages having vacuum tubes coupled in cascade, each stage including a vacuum tube having a control grid, means for restricting the tendency of at least one of said tubes to overload with increase of impressed input voltage on a first of said stages, said means comprising a unilateral conducting path connected directly between the control grid of the vacuum tube in a first of said stages and the control grid of the vacuum tube in a second of said stages so as to feed back to the grid of the first-mentioned tube instantaneous voltage of polarity opposite to that of said impressed input voltage.

SAMUEL BERMAN.

REFERENCES CITED

The following references are of record in the file of this patent:

UNITED STATES PATENTS

| Number | Name | Date |
|---|---|---|
| 2,200,055 | Burnett | May 7, 1940 |
| 2,254,114 | Wilson | Aug. 26, 1941 |
| 2,284,102 | Rosencrans | May 26, 1942 |
| 2,295,410 | Kreuzer | Sept. 8, 1942 |
| 2,343,207 | Schrader et al. | Feb. 29, 1944 |
| 2,390,503 | Atkins | Dec. 11, 1945 |